United States Patent [19]

Gardner

[11] Patent Number: 4,816,236
[45] Date of Patent: Mar. 28, 1989

[54] RECOVERY OF VANADIUM AND NICKEL FROM PETROLEUM RESIDUES

[75] Inventor: Harry E. Gardner, Grand Junction, Colo.

[73] Assignee: U.S. Vanadium Corporation, Danbury, Conn.

[21] Appl. No.: 134,666

[22] Filed: Dec. 18, 1987

Related U.S. Application Data

[63] Continuation of Ser. No. 901,236, Aug. 28, 1986, abandoned.

[51] Int. Cl.$^4$ .................. C01G 53/00; C01G 31/00
[52] U.S. Cl. .......................... 423/65; 423/66; 423/67; 423/68; 423/146; 423/145; 423/140; 423/150; 75/24; 75/25; 75/63; 75/101 R; 75/119; 75/112
[58] Field of Search ............ 75/101 R, 82, 119, 65 R, 75/121, 24, 63, 25; 423/66, 67, 68, 145, 150, 65, 146, 140

[56] References Cited

U.S. PATENT DOCUMENTS

| | | | |
|---|---|---|---|
| 4,389,378 | 6/1983 | McCorriston | 423/68 |
| 4,472,360 | 9/1984 | McCorriston | 423/68 |
| 4,477,416 | 10/1984 | Goddard | 423/67 |
| 4,536,374 | 8/1985 | McCorriston | 423/68 |
| 4,539,186 | 9/1985 | Schemel et al. | 423/150 |
| 4,645,651 | 2/1987 | Hahn et al. | 423/68 |

FOREIGN PATENT DOCUMENTS

| | | | |
|---|---|---|---|
| 448090 | 9/1964 | Japan | 423/68 |
| 0181709 | 10/1983 | Japan | 423/68 |

OTHER PUBLICATIONS

Jack, Thomas R. et al. "Leaching of Vanadium and Other Metals from Athabasca Oil Sands Coke and Coke Ash", Fuel, 1979, vol. 58, Aug., pp. 589-594.

Primary Examiner—Robert L. Stoll
Attorney, Agent, or Firm—William C. Crutcher

[57] ABSTRACT

A process is provided for the recovery of vanadium and nickel values from petroleum residues and, in particular, from Flexicoke. In the process, Flexicoke is blended with an alkali metal source, such as sodium sulfate or sodium carbonate, and then roasted in an oxygen-containing gas until carbon is removed and a fused mixture is obtained. Thereafter, the vanadium is leached from the mixture with an aqueous solution, and nickel is contained in solids remaining from the leaching.

5 Claims, 2 Drawing Sheets

RECOVERY OF VANADIUM AND NICKEL FROM PETROLEUM RESIDUES

This application is a continuation of application Ser. No. 901,236, filed Aug. 28, 1986 now abandoned.

FIELD OF THE INVENTION

This invention relates in general to a process for the separate recovery of vanadium and nickel values from sulfur-containing petroleum residues. In one aspect, this invention is directed to a process for the recovery of vanadium and nickel values from Flexicoke.

BACKGROUND OF THE INVENTION

Vanadium is a highly versatile metal and finds use principally as an alloying element in iron where the addition of amounts as small as 0.1 percent or less to carbon steel can greatly enhance strength, toughness and ductility. These high-strength low alloy (HSLA) steels are used widely in the construction of bridges, buildings, pipelines and the like. This versatile metal is also useful in the preparation of high performance metals, such as those comprised of titanium, aluminum and vanadium. Additionally, vanadium is employed in catalysts used in the manufacture of sulfuric acid and rubbers.

However, even though vanadium is considered to be a fairly common element, it is rarely found in sufficient concentrations in the earth's surface where it can be mined economically for the element alone.

Vanadium produced outside of the United States is usually obtained as a by-product in the processing of iron ores, such as titaniferous magnitite. The major reserves of such ores are found in such countries as Russia, the People's Republic of China and the Republic of South Africa.

Until recently, more than one half of the vanadium mined in the United States was obtained as a by-product in the mining of uranium. However, due to the reduction in nuclear power plant construction, the current demand for uranium has diminished and, hence, the United States vanadium industry has also suffered. Thus, due to the downturn in the development of new uranium mines in the United States and elsewhere, vanadium suppliers may be unable to satisfy the demand due to changing world conditions. Although the Republic of South Africa is one of the world's largest suppliers of vanadium, its present political climate does not insure a continued source of this valuable metal. Russian vanadium is not sold on the world market and the Chinese supply has been erratic.

More recently, petroleum and petroleum by-products have been investigated as a possible source of vanadium since nearly all crude oils contain at least trace amounts of vanadium. The presence of vanadium is, of course, undesirable in the processing of crude oil since it contaminates the hydrocracking and hydroforming catalysts. Power plants that burn crude oil having a high vanadium content are known to end up with vanadium-bearing fly ash and vanadium-bearing boiler residues.

In the mid 1970's a process was developed by the Exxon Research and Engineering Company for increasing the quantity of distillate from ultra-heavy crude oils. This method, referred to as "Flexicoking" produces (a) demetallized coker gas oils, (b) naphtha, (c) coke gas and (d) product coke. Flexicoking is a combination of fluid bed coking and coke gasification which concentrates 99 percent of the contained metals into a coke purge stream product, containing high levels of vanadium and nickel.

In practice, Flexicoking is a coking-gasification process which is carried out in three vessels (a fluid coker, a heater and a coke gasifier) containing fluidized coke solids. The three vessels are interconnected to permit transfer of solid from one vessel to another. Vacuum distillation bottoms are fed to the Flexicoker and about 95 percent of the coke that would normally be produced in a fluid coker is consumed in the production of a low BTU gas. The metallics are concentrated in the remaining coke which is appropriately referred to as "Flexicoke". Thus, Flexicoking at high coke gasification levels can result in a high concentration of metals in the Flexicoke product. This high metals content coke is a potential source of valuable vanadium and nickel.

The Flexicoke product can be a composite of three streams from the Flexicoke processing unit. A bleed coke stream from the heater bed to control the level of metallic buildup, and two streams from the product gas, i.e., tertiary cyclone fines and venturi scrubber cake. For example, Flexicoke from the heater bed will usually contain from about 1 to about 5 weight percent vanadium calculated as vanadium pentoxide, whereas Flexicoke from the wet scrubber may contain as much as 20 weight percent vanadium calculated as vanadium pentoxide. The cyclone venturi fines will normally contain 8 to 12 weight percent vanadium pentoxide. Thus, although the Flexicoke employed in the examples which follow is a blend of residues from each of the three sources, one may find it more desirable to use Flexicoke from just a single source, such as the wet scrubber cake which will usually contain the highest concentration of vanadium.

In practice, the vanadium recovered in the United States from utility ashes and refinery residues is mainly of foreign origin. Domestic petroleum crudes rarely contain more than 15 ppm vanadium and usually much less. In contrast, Venezuelan crudes average about 200 ppm vanadium and sometimes as high as 350 ppm. Hence, utility companies that burn Venezuelan crudes or Flexicoke units that employ Venezuelan crude present an attractive source for this desirable metal. In addition to vanadium, Flexicoke contains recoverable amounts of nickel. However, to date no satisfactory process has been found by which good recovery of vanadium is achieved with good separation from nickel and other impurities without employing expensive reagents and highly specialized equipment.

McCorriston in U.S. Pat. Nos. 4,389,378; 4,472,360 and 4,536,374 discloses processes for recovering vanadium from cokes and ashes derived from heavy oils. In these processes, the coke or ash is admixed with an alkali metal carbonate and then heated to an elevated temperature below the fusion point of the reagent. The mixture can then be subjected to leaching for the recovery of vanadium. Nickel, if sought, however, must still be recovered.

Barclay in U.S. Pat. No. 4,420,464 discloses, among other things, the recovery of vanadium from Flexicoke in which the Flexicoke is gasified to produce medium BTU heating fuels and withdrawing from the gasifier, a molten salt pool which pool is then treated with an oxygen-containing gas to convert the vanadium into a water-soluble form. After quenching in an aqueous solution and ash removal, the solution is reacted with carbon dioxide to produce alkali metal bicarbonates and hydrogen sulfide. The bicarbonates precipitate and vanadium can be recovered from the solution. Nickel, if sought, must be recovered by a separate mechanism.

Metrailer, et al., in U.S. Pat. No. 4,203,759 also disclose recovery of vanadium from partially gasified coke. The disclosed process involves heating the partially gasified coke in an oxidizing atmosphere at a temperature below the fusion point. The vanadium can then be leached with sulfuric acid, and, depending upon the particle size, up to 99 percent of the vanadium can be recovered. Nickel must be recovered by a separate mechanism.

SUMMARY OF THE INVENTION

It has been discovered in accordance with the present invention that vanadium and nickel values can be recovered from petroleum residue by a simple and economical process using inexpensive reagents and available equipment. Additionally, the present invention provides a convenient method for the separation and recovery of vanadium and nickel contained in such residues. Additionally, aspects of the process of the present invention involves burning of carbon from the metal-containing residues and, hence, one could use the heat with additional resulting economic savings.

BRIEF DESCRIPTION OF THE DRAWINGS

The process of the present invention will become more apparent from the following detailed description and accompanying drawings wherein.

DETAILED DESCRIPTION OF THE INVENTION

Figure 1:
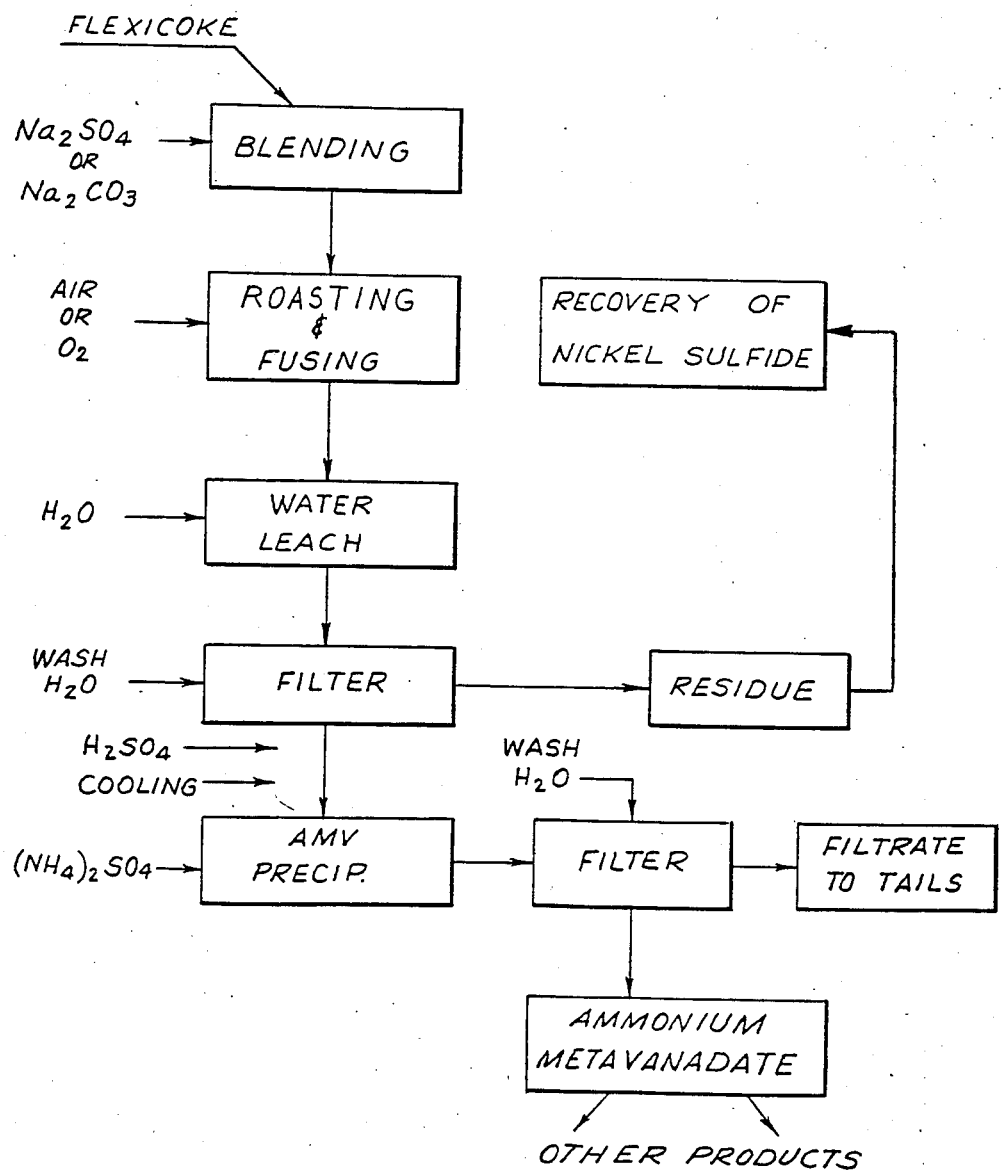
FIG. 1 is a flow diagram illustrating one method by which vanadium and nickel values are recovered from Flexicoke or petroleum residues.

As indicated above, the present invention is directed to a process for the recovery of vanadium and nickel values from sulfur-containing petroleum residues which are characterized by the presence of relatively large quantities of vanadium and nickel.

In one aspect of the invention, the process comprises the steps of:

(a) admixing a petroleum residue and at least one alkali metal source such as an alkali metal compound selected from the group consisting of sulfates, carbonates, bicarbonates, hydroxides and chlorides;

(b) roasting said mixture in the presence of an oxygen-containing gas at a temperature and for a period of time sufficient to effect removal of carbon and provide a fused mixture which solidifies upon cooling and contains said vanadium at least a portion of which is alkali metal vanadate and contains said nickel; and (c) leaching said solidified mixture with an aqueous solution to obtain a solution having an increased vanadium to nickel ratio as compared to that in the petroleum residue and provide a solids fraction containing fused particles rich in nickel values as compared to that in the petroleum residue.

The leaching solution is usually filtered to remove the solids. Vanadium can be removed from the leaching solution and nickel can be recovered from the solids.

By conducting the process in the manner set forth above, it is possible to recover not only the desired vanadium, but also the nickel which is also present in the petroleum residue. For example, it has been found that by the process of the present invention vanadium can be recovered from the petroleum residue in amounts up to at least about 95 percent of the vanadium contained in such residue. Commonly, the solution after leaching has a substantial absence of nickel.

In another embodiment, the petroleum residue is burned to reduce the carbon content (and thereby increase the vanadium and nickel concentration) before conducting the roasting step in the presence of the alkali metal source. However, in this embodiment it is important to control the temperature of burning so that it does not exceed about 600° C. to prevent formation of species which would adversely affect recovery of vanadium and nickel. While not wishing to be bound by any theory regarding the reasons for the difficulties which occur at the higher temperatures, it is believed that the nickel present might combine with the vanadium to form a refractory compound if the temperature is too high and the heating effected for too long a period.

The petroleum residue may be, e.g., fly ash, boiler residue, Flexicoke, and the like which contain metal and vanadium values. The residue frequently contains between about 2 and 95 weight percent carbon, and, when fed to the roasting step, usually contains about 2 to 50 or 60 weight percent carbon. The amount of vanadium, nickel and sulfur will depend upon the nature of petroleum residue and the previous treatment of the petroleum residue, e.g., the extent to which carbon values have been removed by combustion. Generally, the petroleum residue contains at least about 1 weight percent vanadium, at least about 0.1 weight percent nickel and at least about 0.1 weight percent sulfur.

With reference to the drawings, FIG. 1 as indicated above, is a flow diagram of one method for recovering the vanadium values from petroleum residues, and in particular, Flexicoke.

In the process as shown in FIG. 1, the Flexicoke is first blended with an alkali metal source. Alkali metal compounds that can be employed include the sodium and potassium sulfates, carbonates, bicarbonates, hydroxides and chlorides. Sodium sulfate and sodium carbonate are preferred because of availability and desirable performance.

Usually residues obtained from the refinery do not require comintuion. Additionally, residues obtained from scrubbers and cyclone recovery units will undoubtedly be of sufficiently fine particle size to be employed without the need for further processing.

The amount of the alkali metal compound that is blended with the residues will, of course, vary depending upon the particular compound employed in the process. The amount employed will at least be slightly in excess of the stoichiometric amount needed to react with the vanadium present in the residue. The amount used, however, may be substantially in excess of the stoichiometric amount, e.g., amounts up to about 100 or more times the stoichiometric may be used but such amounts may be impractical from an economic standpoint.

Blending of the alkali metal reagent compound with the Flexicoke can be effected using conventional blending equipment which is normally employed in blending dry materials. Such equipment comes in a variety of types and the particular size or design selected will depend upon several factors, such as the size of the operation, plant layout and the like.

After blending, the mixture is roasted in the presence of an oxygen-containing gas, with air being the most convenient and readily available. As used herein, the term "roasting" connotes the presence of the alkali metal source. Roasting is effected at a temperature and for a period of time sufficient to complete combustion of most of the carbon present and to provide a fused mixture.

This mixture is unique in that the vanadium-containing liquid phase and nickel-containing liquid phase are mutually insoluble and upon cooling the nickle-containing liquid phase solidifies separately. The nickel and vanadium are easily separated by leaching from the water-soluble vanadium components.

In practice, when the Flexicoke is roasted in the presence of an alkali metal source it has been found that temperatures of at least about 800° C. and periods of time of at least about one hour will adequately remove the carbon and react to form the soluble vanadates. Of course, temperatures above and below 800° C. can also be employed, as well as longer roasting times, and will vary depending upon a variety of factors. Often, the temperature for roasting is between about 800° C. and 1200° C. and the roasting continues for about 1 to 24 or more hours. It has been noted that the heat content of the Flexicoke is large enough so that the process could be energy self-sufficient.

It is understood that in certain instances it may be advantageous to reduce the carbon in the Flexicoke residue before the roasting step. This can be accomplished by burning the Flexicoke in a rotary kiln, fluid bed roaster, multiple hearth or other means to remove carbon and provide a concentrated residue which can then be crushed and blended with the alkali metal source. Thereafter, the blended mixture can be processed in accordance with the teachings of the present invention. This approach is discussed, later, in more detail.

After the roasting step the solidified mixture is pulverized and leached with an aqueous solution as indicated in FIG. 1. Leaching can be effected with water at a temperature of from about 60° C. to about 100° C., whereby the vanadium is dissolved in the water and then separated from the solids, e.g., by filtration. The solids which contains water-insoluble nickel can then be further processed for recovery of nickel values.

The filtrate containing the vanadium and any subsequent washings of the solid residues can be combined, and treated by any conventional process to recover the vanadium in soluble form.

Figure 2:
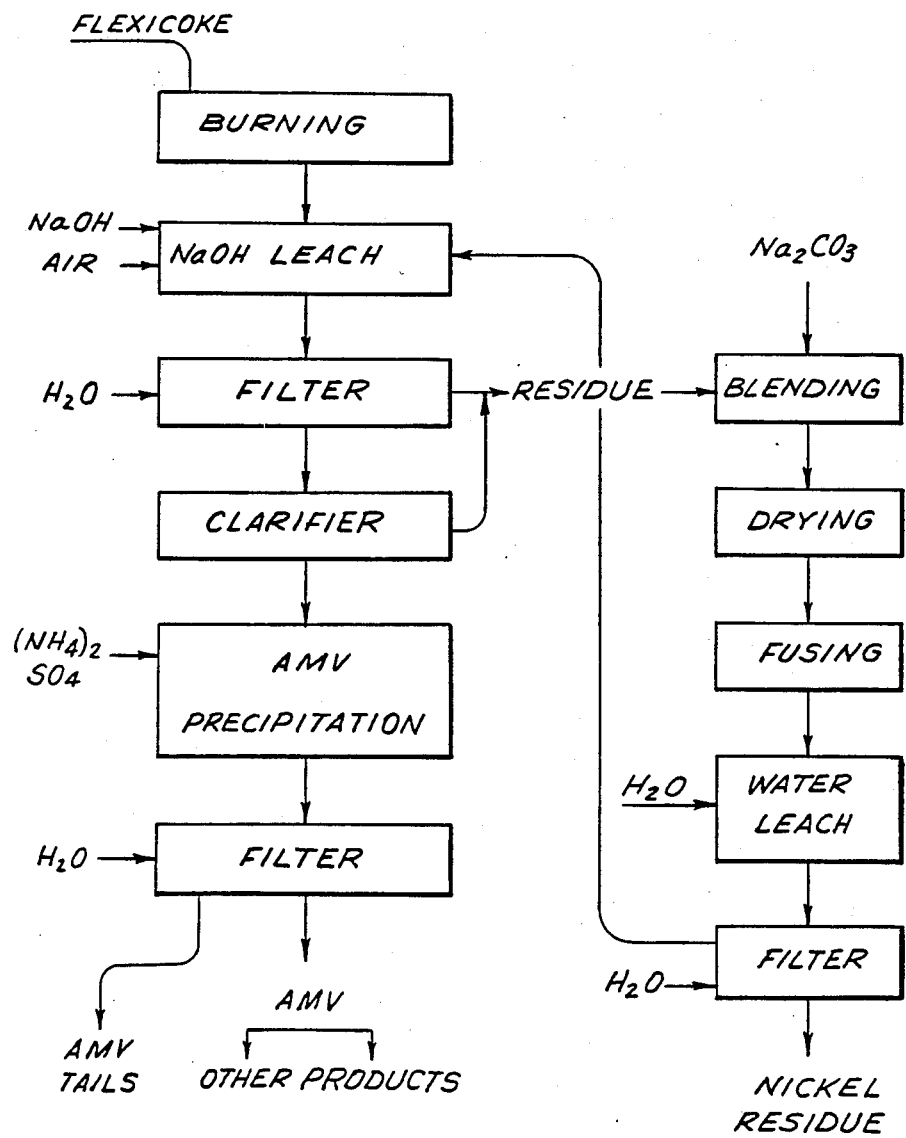
FIG. 2 is a flow diagram illustrating an additional method by which vanadium and nickel values can be recovered and separated from the Flexicoke or petroleum residues.

Another method is set forth in FIG. 2 which is a flow diagram of an alternate process wherein the Flexicoke is burned at a temperature of from about 400° C. to about 600° C., for a period of at least about three hours.

The control of this burning step is very critical since it is noted that temperatures over 600° C. result in the formation of vanadium compounds that are difficult to convert to the soluble form in subsequent steps.

The calcines from this burning can be crushed (if necessary) and used as the residue in accordance with this invention or may be leached with an aqueous sodium hydroxide to remove a major portion of the contained vanadium. In the later case, the residue after leaching is then dried and blended with the alkaline metal source, such as sodium carbonate, and treated in accordance with the sequence of steps set forth in FIG. 1, and as set forth in steps (a)–(e) above. The filtrate obtained in step (d) of the aforementioned procedure is then recycled and combined with the sodium hydroxide lixiviant in the process as shown in FIG. 2.

As is evident from the two Figures, the process outlined in FIG. 2 is a more elaborate scheme that provides more flexibility in the processing of residues and may be more compatible with many of the existing plant facilities.

The following examples illustrate the invention. Examples 1 and 2 illustrate the process of this invention wherein Flexicoke is roasted with an alkali metal source without prior treatment. Example 3 illustrates the process of the present invention wherein a series of samples were pretreated to simulate an integrated process for recovering vanadium from Flexicoke. In this example the Flexicoke is ashed and then subjected to an NaOH leach. Thereafter the residue is roasted with $Na_2CO_3$ until fused. The fusion product is then leached with water to dissolve the vanadium. The water leach liquor is then used as the lixiviant for the next NaOH leach batch to build-up the grade of the liquor so that the vanadium in the caustic leach filtrate can be precipitated to produce ammonium metavanadate. This process results in over 98% recovery of the vanadium with a residue that is 35 to 50% nickel.

EXAMPLE 1

Ten grams of Flexicoke were blended with 1.60 grams of sodium sulfate in a small porcelain crucible. The mixture was heated in an electric muffle furnace at 800° C. for one hour. The mixture gradually decomposed and finally formed a fused mass in the bottom of the crucible which solidified when removed from the furnace. The sample then weighed 2.05 grams. The crucible and sample were leached in boiling water for about 2 hours to remove the sample and dissolve the soluble vanadium. After filtering, 200 ml of solution containing 99.9 percent of the vanadium was obtained. The insoluble material consisted of 0.074 grams of metallic pellets comprising nickel sulfide and a small amount of amorphous residue.

EXAMPLE 2

Ten grams of Flexicoke were blended with 1.19 grams of sodium carbonate in a small porcelain crucible. The mixture was heated in a furnace at 800° C. for two hours to burn off the carbon and fuse the mixture. After cooling the sample weighed 2.02 grams. After boiling the crucible in water for about two hours, 90 ml of solution were recovered which contained 99.2 percent of the vanadium in the sample. In this example, 0.081 gram of nickel sulfide was separated as solids.

EXAMPLE 3

Burning of Flexicoke

The Flexicoke sample used for these tests was received from the Hot Springs Stockpile in Arkansas. Water content was 27.3%. Assays were 11.36% $V_2O_5$, 84.3% C, 0.87% Ni, and 2.7% S (dry basis). Five hundred grams of sample were burned as feed to each leach cycle by burning in a muffle furnace starting at ambient temperature and raising to 425° C. in about 30 minutes with a total time of three to five hours. The results of the six burn tests are presented in Table 1. In test 5, the temperature was increased to 500° C. for an additional hour which reduced the carbon to 3.13%. Analysis of the six tests is set forth in Table 1 below:

TABLE I

BURNING OF FLEXICOKE TO PRODUCE CALCINES
(500 grams Flexicoke)

| Roast No. | Calcine Wt. | % Orig. Wt. | % $V_2O_5$ | % Ni | % C | % S | % $SiO_2$ |
|---|---|---|---|---|---|---|---|
| 1 | 63.6 g | 13 | 69 | 10 | 11 | 1.0 | 5.7 |
| 2 | 58.2 g | 12 | 69 | 10 | 11 | 1.0 | 4.9 |
| 3 | 64.3 g | 13 | 61 | 9 | 18 | 1.1 | 2.6 |
| 4 | 58.4 g | 12 | 71 | 11 | 10 | 1.1 | 3.9 |
| 5[1] | 52.5 g | 11 | 78 | 11 | 3 | 0.7 | 4.3 |
| 6 | 57.1 g | 11 | 72 | 10 | 13 | 0.9 | 3.7 |

[1] Temperature to 500° C for one hour.

Caustic Leach of Flexicoke Calcines

Fifty grams of each batch of calcines from the burning tests in Example 3 were leached with NaOH using the filtrate from the subsequent fusion-water leach test as the lixiviant. Sodium hydroxide was added to maintain the leach pH at 10.2–10.5. The leach was run for four hours at 80°–90° C. with an air sparge of 250 ml/min. The results of these leaches are shown in Table II. The amount of vanadium dissolved from the calcines in this step can only be estimated since the grade of the recycled liquor from the fusion leach was not determined. The insoluble residue was dried, mixed with an equal weight of $Na_2CO_3$, and fused. The filtrate was treated to precipitate ammonium metavanadate.

TABLE II

NaOH LEACHING OF CALCINES
(50 grams of calcine)

| | Calcine | Leach | | | Filtrate | | | Leach Solids |
|---|---|---|---|---|---|---|---|---|
| Leach No. | Contained $V_2O_5$, g | NaOH, g | Filtrate,[1] mL | $H_2O$ mL | Volume ml[2] | pH | $V_2O_5$ g/L | Weight g |
| 1 | 34.35 | 27.25 | — | 225 | 250 | 11.0 | 98.0 | 24.1 |
| 2 | 34.50 | 4.75 | 257 | — | 290 | 11.0 | 113.7 | 27.7 |
| 3 | 30.68 | 8.75 | 170 | 50 | 250 | 11.0 | 136.1 | 27.6 |
| 4 | 35.74 | 12.50 | 152 | 68 | 288 | 10.9 | 123.2 | 23.6 |
| 5 | 39.20 | 7.50 | 170 | 50 | 235 | 10.5 | 155.1 | 23.6 |
| 6 | 35.80 | 2.50 | 188 | 32 | 202 | 9.9 | 193.0 | 25.4 |

[1] filtrate from previous test.
[2] including wash water (deionized)

Fusion of Caustic Leach Residue with $Na_2CO_3$ and Water Leach

The residue from the NaOH leach of the calcines (Example 3, Table II) was mixed with an equal weight of $Na_2CO_3$. The mixture was spread out in a shallow tray (2¾×5¾×1 inch deep-previously saturated with molten $Na_2SO_4$), then inserted into the muffle furance at 500° C. The temperature was then raised to 800° C. for about one hour, then to 850° C. for one hour. Each fusion for samples 1 to 6 was mostly semi-fluid and had to be scraped from the dish but most of the material was recovered from the dish each time. The solid fusion was then pulverized in an iron mortar and pestle and leached with water at 80°–90° C. for one hour. The residue was washed with water and submitted for assay. The entire filtrate was used as the lixiviant for the next calcine leach. A summary of the data and results of these fusions is presented in Table III below. It is seen that a fairly low vanadium residue was achieved in tests 2–6 (1.84% $V_2O_5$ average). The nickel in the residue was upgraded to an average of 44.6% Ni. Vanadium loss to the residue was only 0.54% of the vanadium in the original Flexicoke.

TABLE III

FUSION OF NaOH LEACH RESIDUE AND WATER LEACH RECOVERY OF VANADIUM

| Fusion Samples | g | % $V_2O_5$ | % C | % Ni | g $V_2O_5$ | $V_2O_5$ Loss % of Original Flexicoke |
|---|---|---|---|---|---|---|
| 1(A) Leach Residue | 9.62 | 1.09 | 6 | 21 | .105 | .93[a] |
| 1(B) Leach Residue | 13.56 | 1.59 | 2 | 16 | .216 | |
| 2 Leach Residue | 8.79 | 1.73 | 1 | 45 | .152 | .44 |
| 3 Leach Residue | 11.83 | 2.13 | 21 | 35 | .252 | .82 |
| 4 Leach Residue | 9.7 | 1.84 | 12 | 52 | .178 | .50 |
| 5 Leach Residue | 10.41 | 1.68 | — | 46 | .175 | .45 |
| 6 Leach Residue | 10.17 | 1.81 | 13 | 44 | .184 | .51 |

[a] combined for 1(A) and 1(B).

Although the invention has been illustrated by the preceding examples, it is not to be construed as being limited to the materials employed therein, but, rather, the invention encompasses the generic area as hereinbefore disclosed. Various embodiments thereof can be made without departing from the spirit and scope thereof.

What is claimed is:

1. A process for separately recovering vandium and nickel values from vanadium- and nickel-containing, sulphur-containing high-carbon petroleum residues which comprises the steps of:
   (a) heating the said residues at temperature of 400° to about 600° C. for at least three hours;
   (b) leaching the resulting burned residues with an aqueous alkaline solution;
   (c) separating and removing the resulting nickel- and vanadium-containing leached residue from the resulting vanadium-containing leach solution;
   (d) forming a mixture of the said leached residue and an amount in excess of vanadium stoichiometry of at least one alkali metal compound selected from the group consisting of sulphates, carbonates, bicarbonates, hydroxides and chlorides;
   (e) roasting said mixture with an oxygen-containing gas at a temperature of 800° to 1200° C. for a period of time sufficient to effect removal of carbon and provide a fused mixture which contains vanadium and nickel;
   (f) cooling the fused mixture comprising mutually insoluble vanadium-containing and nickel-containing liquid phases and separately solidifying the vanadium-containing phase and a nickel-containing phase;
   (g) selectively leaching the resulting solidified vanadium-containing phase with water;

(h) separating and removing the resulting vanadium-containing water leach solution from the nickel-containing water leach residue;

(i) recycling the vanadium-containing water leach solution to step (b) as the lixiviant for repetition of the alkaline leach; and (j) recovering vanadium from the resulting vanadium-enriched alkaline leach solution.

2. The process of claim 1 wherein said alkaline solution is a sodium hydroxide solution.

3. The process of claim 1 wherein said residues are fly ash.

4. The process of claim 1 wherein said residues are boiler residues.

5. A process for separately recovering vanadium and nickel values from vandium- and nickel-containing, sulfur-containing, high carbon petroleum residues which comprises the steps of:

(a) heating the said residues at temperature of 400° to about 600° C. for at least three hours;

(b) leaching the resulting burned residues with an aqueous alkaline solution;

(c) separating and removing the resulting nickel- and vanadium-containing leached residue from the resulting vanadium-containing leach solution;

(d) forming a mixture of the said leached residue and an amount in excess of vanadium stoichiometry of at least one alkali metal compound selected from the group consisting of sulphates, carbonates, bicarbonates, hydroxides and chlorides;

(e) roasting said mixture with an oxygen containing gas at a temperature of 800° to 1200° C. for a period of time sufficient to effect removal of carbon and provide a fused mixture which contains vanadium and nickel;

(f) cooling and solidifying the fused mixture;

(g) contacting the resulting solidified fused mixture with water and thereby selectively leaching vanadium from the said mixture;

(h) separating and removing the resulting vanadium-containing water leach solution from the nickel-containing water leach residue;

(i) recycling of vanadium-containing water leach solution to step (b) as the lixiviant for repetition of the alkaline leach; and (j) recovering vanadium from the resulting vanadium-enriched alkaline leach solution.

* * * * *